United States Patent Office 3,437,630
Patented Apr. 8, 1969

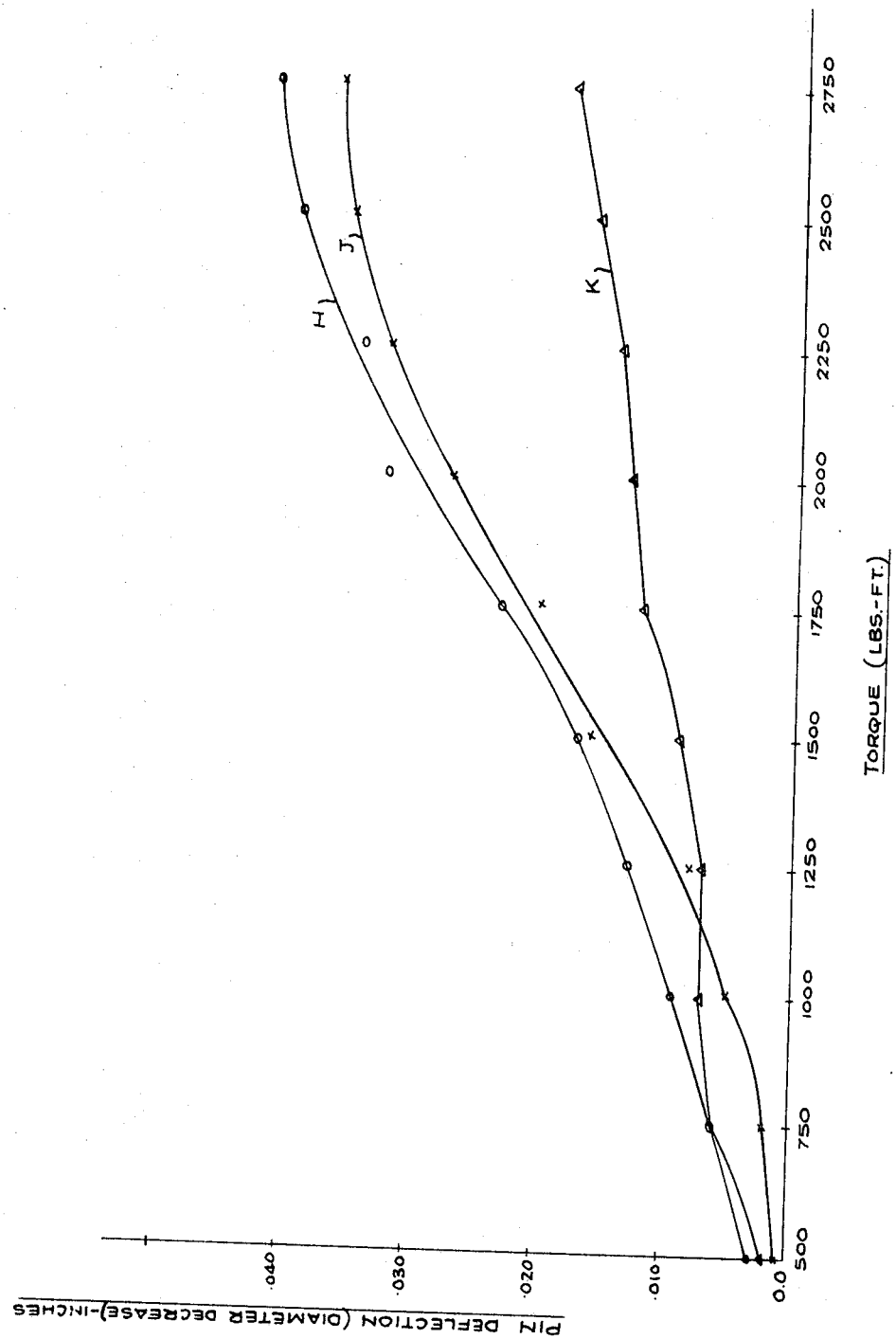

3,437,630
THREAD SEALING COMPOSITION
Denzal W. Van Winkle, La Mirada, and Fredrick Madden Carlisle, Whittier, Calif., assignors to Baker Oil Tools, Inc., City of Commerce, Calif., a corporation of California
Filed Dec. 20, 1965, Ser. No. 514,902
Int. Cl. C10m 7/28; C09k 3/10
U.S. Cl. 260—33.6     8 Claims

ABSTRACT OF THE DISCLOSURE

Thread sealing composition consisting essentially of a substantial proportion of a grease, a minor proportion of a solid, deformable plastic substance, preferably tetrafluoroethylene resin, and a minor proportion of a pulverulent mineral substance, preferably talc, said resin and talc being in suspension in the grease, such composition having improved pressure sealing and lubricating characteristics and can be employed in both oil well applications and food processing, and is of reduced cost.

---

This invention relates to sealants and lubricants, and is particularly concerned with thread sealing and lubricating compositions for use in pipe joints, especially where high pressures are applied.

In oil well applications, pipe joints are commonly employed comprising male and female threaded connections, known as box and pin joints. Such connections are generally used on oil well tubing, casing and line pipe. In making up such joints, it has been found advantageous to employ a thread lubricant to facilitate the operation. During use, such connections are subjected to high pressures, and the joints accordingly must be properly sealed to prevent leakage. This problem of producing leakproof joints is also encountered where high pressures are applied in hydraulic or pneumatic systems having threaded connections. The problem of preventing leakage under these conditions is particularly acute when the threads are badly worn or imperfectly machined.

Various pipe thread compounds have been offered commercially. However, none of these has been found completely satisfactory at the high pressures and also at the high temperatures encountered in oil field operations.

It is known to incorporate fibers, such as glass fibers, asbestos fibers, wool and casein fibers, into grease. However, such grease compositions are employed mainly as wheel bearing or chassis lubricants and are not designed for use as thread sealing compositions which are high pressure sealants, and particularly high pressure sealants resistant to high temperatures.

Further, as previously indicated, the design of a satisfactory thread sealing composition is further complicated by the problem of obtaining an adequate seal at high pressures for those threaded connections, and particularly tapered threads, which have been subjected to substantial wear, as is common in oil field tubular equipment.

There is, accordingly, a considerable demand for the provision of a pipe thread composition which has superior lubricating and sealing properties as compared to presently available products, and especially for a thread composition particularly effective in oil well operations to form a high pressure seal against leaks, especially at high operating temperatures. Also, an improved pipe thread composition is required which is effective as a high pressure sealant for joints having badly worn threads, which permits tighter make-up of joints with less torque than prior art compositions, thus reducing wear on threads, and which will not cause the threaded fittings to "freeze" together as the result of inadequate lubrication or due to corrosion, such as to require excessive torque to unscrew the joint. There is also a growing demand for an improved thread sealing composition having the characteristics noted above which can be used in sealing joints of pipes carrying corrosive fluids, and also for use in sealing threads of pipes employed in the food processing industries and which requires a non-toxic, and preferably light colored or white thread sealing compound. Another criterion of any such improved thread sealing composition is its ability to be easily and rapidly applied, and its facile formulation from readily available materials which are relatively inexpensive and economical to use.

In U.S. patent application Ser. No. 327,699, filed Dec. 3, 1963 (and now abandoned), of Herbert L. Bigelow, there is described an improved thread sealing composition having many of the important characteristics and advantages noted above, and consisting essentially of a major proportion of a vehicle in the form of a grease-like material, and a minor proportion of a granular plastic material in suspension in such grease-like material. A preferred granular plastic additive for use in such thread sealing composition is noted to be Teflon. Although such compositions have proved particularly successful for use in oil well applications, these compositions are not suitable and acceptable for certain applications such as in the food processing industry, due to the dark, usually dark gray or black, coloration of the composition. As previously noted, thread sealing compositions for piping employed in food processing usually not only require a high degree of non-toxicity but also generally demand the use of light colored or white compositions to avoid imparting any coloration to the food compositions being processed. Also, when using the preferred thread sealing compositions according to such application, containing Teflon as the effective granular plastic additive, such material is relatively expensive and increases the cost of the thread sealing compositions, particularly where such compositions contain a substantial amount of Teflon, e.g., of the order of about 20% or more.

According to the present invention, it has now been found that most of the advantageous properties noted above can be achieved by the provision of an improved thread sealing composition consisting essentially of a substantial or major proportion of a vehicle in the form of a grease-like material, that is, a material of grease-like consistency, a minor proportion of a solid deformable particulate, preferably granular, plastic substance, and a minor proportion of a pulverulent lubricity improving mineral substance having a structure which permits sliding of the discrete particles or portions thereof with respect to each other, both of said substances being in suspension in the grease-like material. A material of particular effectiveness as the granular plastic material in such composition has been found to be granules of the material marketed as Teflon, and which is tetrafluoroethylene resin, and a particularly effective lubricity improving mineral substance for incorporation in such composition has been found to be the substance talc, generally available in fine powder form.

The incorporation of the above noted mineral substance, preferably talc, into the thread sealing composition of the above noted copending application, containing a grease and granular deformable plastic material, preferably Teflon, materially increases the pressure sealing and lubricating characteristics of such composition. According to the present invention, generally a proportion of the granular plastic material, e.g., Teflon, of the thread sealing composition of the above copending application, is replaced by an equivalent amount of the mineral lubricity improving substance, e.g., talc, and it has been found surprisingly that the resulting properties, particularly with respect to thread lubrication, are at least equal or superior to results obtained using an amount of granular plastic material, e.g., Teflon, alone, according to the invention of the copending application, which is equal to the sum total of the amount of both the granular plastic material, e.g., Teflon, and the mineral substance, e.g., talc, employed in the composition of the instant invention.

Further, not only does the presence of the mineral substance, e.g., talc, improve both the thread sealing properties and the lubricating properties of the thread sealing composition containing a grease and granular plastic material, e.g., Teflon, but in addition, and particularly when the grease employed as the vehicle is one which is graphite-free, such thread sealing composition has a light or white coloration, and is also non-toxic, thus qualifying such invention composition for use in piping employed in the food industry.

Tests have shown that the thread sealing composition of the invention, e.g., a thread sealing composition composed of a grease having Teflon granules and talc particles dispersed therein, preferably in certain proportions as described in detail below, has outstanding high-pressure sealing and also lubricating characteristics. Thus, the use of such additives in a grease-like vehicle on tapered thread joints of oil well pipe has been found to hold pressures of the order of 10,000 p.s.i. at ambient temperature and at elevated temperatures, e.g., in the vicinity of 600° F., even where the threads are badly worn or imperfectly machined, whereas thread sealing compositions of the prior art used in such tests leak at lower pressures. Further, the above invention composition requires less torque to make up the same thread to the same point as compared to prior art thread compounds due, it is believed, to the reduced friction afforded by the presence of the deformable granular plastic, e.g., Teflon, and the mineral lubricity improving substance, e.g., talc, additives. Because the plastic granular and mineral additives incorporated in the grease-like vehicle effectively seal off leak paths, and because they permit tighter make-up with less torque, threads are protected from premature wear while extending both the use and life of the threads. Also, the presence of the additives in the grease-like vehicle reduces the tendency of "freezing" of the threads and avoids the need for high break-out torque, yet the invention composition holds make-up even when the joints are subjected to prolonged vibration and cycle loading. Joints break out easily and cleanly without galling due to the improved lubricating properties afforded by the presence of the granular plastic, e.g., Teflon, and mineral, e.g., talc, additives in the grease-like or grease vehicle.

Both the granular plastic additive, e.g., Teflon, and the lubricity improving mineral substance, e.g., talc, have high temperature resistance and are effective in sealing threads at temperatures aproaching 600° F., substantially without destruction of such additives, and the composition remains effective at these elevated temperatures. Further, the thread sealing composition has viscosity characteristics which render the composition readily applicable to pipe threads by means of a brush, even in cold weather, so that considerable time can be saved, for example, while running tubing in oil wells using the invention composition. By using the plastic granules, e.g., Teflon, and the particles of the mineral substance, e.g., talc, of controlled and graded particle size in a grease-like vehicle, threads of various sizes and profiles, and with various clearances, can be sealed. Moreover, the additives such as Teflon and talc, are chemically inert and are effective as a thread or joint seal even in a corrosive environment. Also, the thread sealing composition of the invention is stable, and does not evaporate, oxidize or harden, either in an open container or on threads.

The viscosity, density and gel strength of the grease-like vehicle employed in the composition of the invention should be such as to keep the deformable plastic particles and the mineral particles employed as additives in suspension so that such particles will function to provide an improved pressure seal according to the invention. A further advantage of the formation of such a suspension is that it will thereby not be necessary to stir or mix the composition each time it is to be employed. Thus, a vehicle having the consistency and viscosity characteristics of heavy oils and greases will keep the deformable plastic, e.g., Teflon, particles or granules, and the particles of mineral or lubricity imparting substance, e.g., talc, in suspension and contribute to ease of application of the thread sealing composition. The ability of the vehicle to keep and maintain the particles of such additives in suspension at elevated temperature depends on the ability of the vehicle to maintain sufficient viscosity at the elevated temperature.

These consistency and viscosity characteristics of the vehicle are measured by the terms "penetration" and "dropping point," respectively. The term "penetration" or "worked penetration," the measure of consistency, is defined as the depth in tenths of a millimeter that a standard cone penetrates the vehicle under prescribed conditions of weight, time and temperature, according to ASTM test D217–60T. The term "dropping point," which is a measure of the resistance against change in viscosity of the vehicle at elevated temperatures, is defined as the temperature at which the vehicle passes from a semi-solid to a liquid state under the conditions of the standard ASTM test D566–42 for this property. The worked penetration at 77° F. of greases, which can be employed in the invention composition, can range from about 200 to about 500. The dropping point of such greases can range from about 90° F. to about 600° F. for the general type of lubricating greases containing a metal soap, the higher the dropping point the more suitable the grease. However, those greases which are gelled by means such as, for example, clays, can have a dropping point substantially higher than 600° F. Although best results are achieved when the vehicle or grease has a penetration and dropping point substantially in the above ranges, these values may lie outside the above ranges and still provide a thread sealing composition having improved lubricating and sealing properties according to the invention.

To meet suitability for general use, including oil field use on tubing and line pipe threads, and in other piping applications, e.g., in the food industry, the vehicle should have certain additional characteristics. These include adequate lubricating qualities, no tendency to disintegrate nor undergo radical change in volume at temperatures at 300° F. and above, absence of any deleterious instability, and resistance to water absorption.

Examples of vehicles suitable for the formulation of thread sealing composition for oil field use according to the invention include greases containing a mineral oil and a minor amount of a metal, e.g., aluminum, calcium or lithium, soap of a fatty acid, such as aluminum or lithium stearate. In addition to a mineral oil and a suitable metal soap, the grease may, but need not, include other materials such as graphite, and finely divided metals such as lead, copper and zinc. Greases composed essentially of viscous petroleum fractions and free from soaps, but containing other gel forming substances such as clays, can also be used as vehicles for the thread sealing compositions of the invention.

However, as previously noted, particularly where the thread sealing composition is to be employed in the food industry where a substantially white composition is desired, greases which are graphite-free and which preferably also are free of other components which impart color, such as metallic particles, are utilized. However, where a light colored or white thread composition is not required, as in oil well pipe applications, a grease containing graphite can be employed, without otherwise adversely affecting the function of the particulate plastic material, e.g., Teflon and/or the pulverulent mineral substance such as talc, of the thread compositions of the invention.

Further, where the thread sealing composition of the invention is to be employed in applications other than oil field use, other vehicles of grease-like consistency can be employed, depending on the particular application. Thus, for example, silicone base greases can be employed where the thread composition is to be used in low-temperature applications, or vegetable oil derivatives can be employed as vehicle where the thread composition is to be used in food or chemical processing.

The following are examples of representative grease-like vehicles which can be employed in the thread sealing compositions of the invention:

COMPOSITION I

Components:

| | |
|---|---|
| Aluminum stearate base grease containing a major amount of mineral oil and aluminum stearate _____percent by weight__ | 35.9 |
| Graphite _____do____ | 18.0 |
| Lead powder _____do____ | 30.5 |
| Copper flake _____do____ | 3.3 |
| Zinc dust _____do____ | 12.3 |
| Worked penetration at 77° F. _____ | 310–340 |
| Dropping point, ° F. minimum _____ | 190 |

COMPOSITION II

Components:

| | |
|---|---|
| Mineral oil _____percent by weight__ | 63 |
| Calcium acetate soap stock _____do____ | 26 |
| Graphite _____do____ | 8 |
| Basic lead carbonate (white lead) _____do____ | 3 |
| Viscosity of the mineral oil at 100° F., SSU__ | 1500 |
| Worked penetration at 77° F. _____ | 450–480 |
| Dropping point, ° F. _____ | 500 |

COMPOSITION III

Mineral oil containing microgel thickener:

| | |
|---|---|
| Worked penetration at 77° F. _____ | 280 |
| Viscosity of the mineral oil at 100° F., SSU__ | 540 |

COMPOSITION IV

Components:

| | |
|---|---|
| Mineral oil _____percent by weight__ | 78 |
| Calcium acetate soap stock _____do____ | 22 |
| Viscosity of the mineral oil at 100° F., SSU__ | 350 |
| Worked penetration _____ | 410–425 |
| Dropping point, ° F. _____ | 500 |

Composition I is known as "API modified" thread compound; Composition II is marketed as Chevron Drill Pipe Lubricant; Composition III is marketed as "Shell Darina"; and Composition IV is marketed as Chevron Duraplex W-1, and is a white grease. Note that Compositions I and II contain graphite, and that Compositions III and IV are graphite-free greases.

The plastic filler substances incorporated in the above-described grease-like vehicles for producing the thread compositions of the invention are solid, deformable plastic materials, preferably thermoplastic materials, and which are preferably employed in granular or flake form. The addition of such plastic granules or particles to the grease-like vehicle does not detract from any of the above-noted desirable characteristics of the vehicle, but function therein to improve the sealing and lubricating properties of the vehicle. The plastic granular material should be capable of remaining in suspension in the above-described grease-like vehicle, and preferably should have a compression strength of about 1,000 to about 20,000 p.s.i., and preferably a modulus of elasticity in tension of about 50,000 to about 500,000 p.s.i. Illustrative types of such plastic fillers which may be employed for purposes of the invention include fluorocarbon resins such as the tetrafluoroethylene resins represented by Teflon, and trifluorochloroethylene resins represented by Kel-F, polyamide resins such as nylon, rubbers, e.g., butadiene-acrylonitrile copolymers as represented by Hycar, polyethylene and polypropylene resins, styrene polymers, and vinyl polymers, such as polyvinyl chloride. Preferred additives of this type for use in the invention composition include Teflon, rubber, particularly Hycar, and nylon. The above-noted additives can be employed separately or in combination, e.g., a combination of Teflon and Hycar.

The above granular plastic materials have the common desirable characteristics of being either elastically or plastically deformable under the mechanical pressure applied between the face and flank surfaces of engaging pipe threads such as to allow the filler materials to be squeezed and compacted into any existing voids. Selection of the particular kind of plastic granules to be employed in the thread composition depends on the intended use of the thread composition and on the physical and economic characteristics of the plastic material, such as temperature resistance, chemical stability, strength and cost. Teflon, with its high temperature resistance characteristics, has been found to be the most desirable plastic additive for use in a thread sealing composition according to the invention for oil field use. As will be noted below, the particle size of the plastic filler materials, such as Teflon, as well as the distribution of particle sizes in the plastic filler mix is of importance to the proper sealing ability of the material.

In order to possess the sealing and lubricating functions above described, the amount of deformable plastic granules incorporated in the thread sealing composition requires proper control. If more than about 45% by weight of the granular plastic filler is employed, the incremental improvement is substantially reduced, and also the composition becomes unduly thick and difficult to handle and to apply to the pipe threads. If too little of the plastic granules is included in the thread sealing composition, the sealing and lubricating characteristics of the composition are significantly reduced. Accordingly, there should be employed not less than about 2% by weight of solid, deformable granular plastic, e.g., Teflon, in the thread sealing composition. Usually, the amount of plastic granules employed is in the range of from about 2% to about 40% by weight of the composition. The most effective proportions of plastic granules present in the composition have been found to range from about 5% to about 30% by weight of the composition.

The particle size of the deformable plastic granules, as well as the distribution of the various sized particles in the filler mix, affects the proper sealing ability of the thread sealing composition of the invention. Those particles in the granular plastic filler mix which are of smaller mesh size, when present in sufficient quantity and distribution in the vehicle, guarantee the sufficiency of enough plastic material so that it will act not only as a filler, but also as a lubricating agent.

Thus, for example, the plastic granule particles can be of a mesh size not substantially smaller than about 200 mesh, and ranging from about 20 to about 200 mesh, the major portion of the plastic granules being of a size through 20 mesh and on 80 mesh ($-20$ to $+80$), at least about 75% of the granules having the last-mentioned mesh size range, and a substantial portion of the granular plastic particles, for example, in the range of about 15% to about 50% by weight of the plastic particles, having a mesh size through 20 and on 40 mesh ($-20$ to $+40$).

As an illustration but not as limitative of the invention, it has been found that the granular plastic material, e.g., Teflon, having a particle gradation or mix of the proportions listed in the table below is suitable.

TABLE I

| Mesh Size: | Percent by Weight Passing | Size Range | Percent by Weight |
|---|---|---|---|
| #20 | 99.6 | Under #20 | 0.4 |
| #40 | 69.1 | #20–#40 | 30.5 |
| #80 | 7.8 | #40–#80 | 61.3 |
| #100 | 4.9 | #80–#100 | 2.9 |
| #140 | 2.0 | #100–#140 | 2.9 |
| #200 | 0.9 | Over #200 | 0.9 |

It is noted from the above Table I that the largest particle size in a significant quantity is between 20 and 40 mesh. This corresponds to a particle size which can range in diameter up to about .008″ to about .010″ in diameter. Such large particle size material, when employed on a threaded coupling and extruded into the root-to-crest clearances of the threads during make-up of the thread connection, are deformed and compacted in such clearance spaces to aid in forming the pressure seal.

It will be understood, however, that the plastic granular material, e.g., Teflon, can be employed in varying particle sizes. Thus, for example, in some instances such material having a substantial proportion of particles smaller than 200 mesh can be employed also.

The lubricity-improving substance employed in conjunction with the deformable granular plastic substance, in the grease-like vehicle according to the invention, is preferably a mineral substance. As previously noted, such mineral substance possesses a structure, for example, which may be plate-like such as in the form of laminae which permits sliding or solid lubrication of the discrete particles or portions of such substance with respect to each other. A preferred group of materials having these characteristics are the phyllosilicates, as disclosed in Dana's Manual of Mineralogy, 17th Edition, pages 447 to 474. A preferred mineral substance of this type for purposes of the invention is talc, a magnesium silicate. Other examples of such phyllosilicates which have suitable lubricating characteristics according to the invention include mica and kaolin. Other mineral lubricity-improving substances which can be employed in conjunction with the granular plastic material according to the invention, include molybdenum disulfide and zinc oxide.

The above-noted mineral materials employed in combination with the granular plastic material, e.g., Teflon, in the grease-like vehicle, substantially improve the lubricating and sealing characteristics of the composition over the same composition in the absence of such mineral materials, while substantially reducing the cost of the composition, particularly when such mineral materials are employed in amounts substantially greater than the Teflon. All of the above mineral materials except molybdenum disulfide when incorporated into a grease-like material or a grease, e.g., one including a mineral oil and a minor amount of a metal soap, together with the granules of plastic material, preferably Teflon, generally result in a light colored or white thread sealing composition according to the invention. However, such light or white coloration is imparted to the thread sealing composition only when a graphite-free grease is employed. Thus, although all of the advantages of the invention are essentially achieved when incorporating the plastic granules, e.g., Teflon, and the lubricity-improving or inorganic mineral substance, e.g., talc, into a grease which may contain graphite, the resulting thread sealing composition will have a grayish or a black color. However, it is particularly desirable to provide a white thread sealing compound according to the invention especially for use of such composition in the food processing industry, and hence under these conditions, it is preferred to employ a grease which is free of graphite.

On the other hand, it will be noted that where a dark colored or black thread sealing composition can be tolerated, for example, for use in oil well operations, the composition can contain graphite. The graphite employed can be that which is present as a component in certain greases which can be employed as vehicle. When graphite is present in the grease used as vehicle, the amount of graphite present should not be greater than about 20% by weight of the composition.

The pulverulent lubricity-improving mineral substance employed together with the plastic granular particles according to the invention should have a suitable particle size. These mineral lubricity-improving materials often are obtainable in very fine powder form. Thus, for example, a suitable and representative form of talc for use in the invention has a fine mesh size generally passing a 325 mesh screen. It will be understood, however, that the mesh or particle sizes of the lubricity-improving material, e.g., talc, can vary from the size mentioned above.

The amount of pulverulent lubricity-improving mineral substance, e.g., talc, which can be employed in the invention thread sealing compositions can range up to about 45% by weight of the composition, but preferably is not in excess of about 35% by weight, because of the increased thickness of the composition employing quantities of this material above about 35%. Thus, generally the amount of this substance, e.g., talc, which can be employed can range from about 5% to about 35%, and preferably is in the range from about 10 to about 35%.

In usual practice, according to the invention, the total amount of granular plastic substance, e.g., Teflon, and lubricity-improving mineral substances, e.g., talc, which can be incorporated into the thread sealing composition should not be above about 50%, and generally ranging from about 10 to about 50%, preferably from about 15 to about 45%. Where small proportions of the granules of plastic material, e.g., Teflon, are employed, within the ranges thereof noted above, proportions of the lubricity imparting or mineral substance, e.g., talc, which are employed generally are in the upper portion of the above-noted range for this material. On the other hand, where larger proportions of Teflon within the above-noted range for this material are employed, proportionately smaller amounts of talc are used, so that the total amount of both substances is within the range of the total amounts of these materials noted above, namely between about 10 to about 50% by weight of the composition.

It will be seen, accordingly, that the incorporation of the lubricity-improving or mineral substance, e.g., talc, together with the granular plastic substance, e.g., Teflon, employed alone in the thread sealing composition of the above Bigelow copending application, not only aids in improving the high pressure thread sealing characteristics of the compound, but since such lubricity-improving substance, e.g., talc, can be employed in place of a substantial proportion of the granular plastic substance, e.g., Teflon, the cost and economics of the manufacture of the thread sealing composition of the invention are substantially reduced over the thread sealing composition of such copending application, since the cost, for example, of talc is only a minor fraction of the cost of the plastic granular substance, particularly Teflon.

The grease-like material or grease employed as the vehicle in the thread sealing composition of the invention generally provides a substantial or major proportion of the thread sealing composition. Thus, for example, the amount of the grease-like material or grease which can be employed can range from about 50 to about 90% by weight of the composition, and generally is in the range of about 55 to about 85% by weight of such composition.

The following are examples of practice of the invention:

Example 1

A series of ½"–14 thread standard type nipples and couplings are tested employing the thread sealing compositions noted below. The crests of the threads of these nipples are flattened to simulate worn threads. The respective nipples and couplings are screwed together and pressure tested at a make-up torque of 200 pound-inches, with water at ambient temperature as the testing fluid, using Compositions A and B below as thread sealing compositions on various test nipple-coupling sets.

COMPOSITION A

|  | Percent by weight |
|---|---|
| Chevron Duraplex graphite-free grease (Composition IV) | 83.5 |
| Teflon granules (screen analysis substantially as shown in Table I) | 16.5 |
|  | 100.0 |

COMPOSITION B

|  | Percent by weight |
|---|---|
| Chevron Duraplex graphite-free grease (Composition IV) | 84 |
| Teflon (screen analysis substantially as in Table I) | 8 |
| Talc (passing a 325 mesh screen) | 8 |
|  | 100 |

The nipples treated with Composition A above leak at about 4,900 p.s.i. average pressure and the nipples treated with Composition B commence to leak at about 5,400 pounds average pressure. Thus, it will be seen that according to the invention Composition B, the substitution of talc in Composition B for a substantial portion of the Teflon in Composition A, and forming a mixture of the talc and Teflon in suspension in the grease as in Composition B, results in improved sealing of the threads as indicated by the higher leakage pressure for the nipples treated with Composition B as compared to Composition A. Note that also the substitution of talc for a substantial proportion of the Teflon in Composition A substantially reduces the cost of the thread sealing composition.

Example 2

Pressure testing of another set of the same type of nipples and couplings noted in Example 1 above is carried out, testing these nipples and couplings for pressure leak after make-up at 200 pound-inches of torque, using Composition C below as a thread sealant.

COMPOSITION C

|  | Percent by weight |
|---|---|
| Chevron Duraplex graphite-free grease (Composition IV) | 77 |
| Teflon (screen analysis substantially as in Table I) | 8 |
| Talc (particle size passing a 325 mesh screen) | 15 |
|  | 100 |

Pressure testing of the coupling-nipple combinations made up with thread sealing Composition C, using water as in Example 1, results in a commencing of leakage at the joint at about 6,500 p.s.i. average pressure.

Thus, comparing the results employing Composition C as compared to invention Composition B in Example 1, it is seen that by increasing the amount of talc to 15% in Composition C as compared to about 8% in Composition B, significantly improved pressure sealing is obtained.

Example 3

Pressure testing of the same types of nipple-coupling combinations as in Example 1 and under the same conditions is carried out using Compositions D and E below on the threads of the respective nipple-coupling sets.

|  | Percent by Weight | |
|---|---|---|
|  | Composition D | Composition E |
| Chevron Duraplex W-1 | 67 | 54 |
| Teflon (screen analysis substantially as in Table I) | 13 | 13 |
| Talc (passing a 325 mesh screen) | 20 | 33 |
|  | 100 | 100 |

In these tests, the nipples treated with thread sealing Composition D commence to leak at about 7,900 p.s.i. average pressure, and the nipple threads treated with Composition E commenced to leak at about 8,800 p.s.i. average pressure. Thus, it is seen, comparing the results using Compositions D and E of the invention containing 20 and 33% talc, respectively, as compared to Composition C of Example 2, containing 15% talc, that by increasing the percentage of talc in the composition including the grease and Teflon, pressure sealing results are substantially improved. Also, comparing the results using Composition E as compared to Composition D, it is seen that the use of 33% talc in E as compared to only 20% in Composition D, the amount of Teflon being substantially the same in both, results in substantially increased pressure sealing.

Compositions B, C, D and E of Examples 1 to 3 above, employing a white graphite-free grease and white talc accordingly are all "white" thread sealing compositions which have utility not only in oil well applications but also in the food processing industry.

Example 4

Pressure tests are carried out on nipple-coupling combinations of the type noted in Example 1 above, under the same conditions as described in Example 1 above, using Composition F noted below.

COMPOSITION F

|  | Percent by weight |
|---|---|
| Chevron Duraplex graphite-free grease | 47 |
| SAE 20 motor oil | 6 |
| Teflon | 47 |
|  | 100 |

The coupling threads treated with Composition F commence to leak at about 9,700 p.s.i. average pressure. These tests show that in order to achieve high pressure sealing results using a composition which does not contain a lubricity-improving mineral substance such as talc, according to the invention, it is necessary to substantially increase the amount of Teflon employed. The large amount of Teflon in Composition F not only imparts undesirably high thickness to the thread sealing composition but substantially increases the cost thereof.

On the other hand, it will be noted in comparing Composition F and invention Compositions B, C, D and E of Examples 1 to 3 above, that by substituting increasing proportions of talc for a portion of the Teflon employed in Composition F, excellent pressure sealing results comparable to the results employing Composition F containing a large amount of Teflon alone, can be achieved, as indicated by the pressure sealing results achieved employing particularly Compositions D and E of the invention.

Example 5

Comparative tests of thread sealing compositions with respect to their lubricating characteristics are carried out as follows. A series of threaded tapered box and pin joints are made up using the respective thread sealing Compositions H, J and K set forth below. Lubricating quality of the respective compositions is measured as a function of the diameter decrease of the male threaded member at a specific torque. The lower the friction, the greater the force available to deform the tapered male thread. For each of the compositions tested, the diameter decrease of the male member is obtained at various increasing applied torques. The thread sealing compositions tested are set forth below.

COMPOSITION H

|  | Parts by Weight | Percent by Weight |
|---|---|---|
| Chevron Duraplex W-1 (graphite-free grease) | 25 | 57 |
| Talc (Sierra Supreme) | 15 | 34 |
| Teflon (screen analysis in Table I) | 4 | 9 |
|  |  | 100 |

COMPOSITION J

|  | Parts by Weight | Percent by Weight |
|---|---|---|
| Chevron Drill Pipe Lubricant (Composition II containing 8% graphite) | 20 | 61 |
| Talc (Sierra Supreme) | 10 | 30 |
| Teflon (screen analysis in Table I) | 3 | 9 |
|  |  | 100 |

COMPOSITION K

|  | Parts by Weight | Percent by Weight |
|---|---|---|
| Chevron Drill Pipe Lubricant (Composition II containing 8% graphite) | 10 | 91 |
| Teflon (screen analysis in Table I) | 1 | 9 |
|  |  | 100 |

The results of these tests are set forth in the plot shown in the drawing in which pin deflection is plotted against torque in pound-feet. For the three curves plotted in the drawing, the curves marked H, J, and K correspond to the results obtained on testing the lubricating power of these compositions when applied to the above-noted threaded members, the pin deflection in each of these tests being measured at increasing torques.

From the graph, it is seen that the lubricating qualities of Compositions H and K of the invention, including both talc and Teflon, are much superior to the lubricating qualities of Composition K containing no talc, particularly at increasing torque above about 1,500 pounds-feet.

Further, it is noted that the lubricating qualities of Composition H of the invention containing somewhat larger amounts of talc as compared to Composition J of the invention, are superior to Composition J, especially at the higher torques.

The results shown in the plot of the drawing clearly indicate that the incorporation of talc, particularly in substantial proportions, into the grease also containing Teflon, as represented by Compositions H and J, substantially increases the lubricity of the resulting compositions over a thread sealing composition only containing Teflon, as represented by Composition K.

Example 6

Thread sealing Compositions H and J are used on pipe joints which are made up to normal torque employing as pressure fluids steam and hot oil at about 600° F. and about 1,600 p.s.i. average pressure. These pipe joints are then disassembled with normal break-out torque and no thread damage.

It is observed that substantially no leakage occurred under these operating conditions, indicating that the improved thread sealing compositions of the invention have the advantages of providing pressure sealing characteristcs and improved lubricating properties at high temperatures as evidenced by ease of make-up and break-out of the pipe joints.

Example 7

In each of Compositions , C, D and E of Examples 1 to 3, the talc in these compositions is substituted by an equal amount of the following lubricity-improving mineral substances: mica, montmorillonite (a kaolin), molybdenum disulfide, zinc oxide.

In pressure tests similar to those set forth in Example 1 above, improved pressure sealing results are obtainable employing the respective above-noted mineral materials in the thread sealing composition containing the grease and the Teflon, over similar compositions containing only Teflon additive.

Example 8

In each of the Compositions B, C, D and E of Examples 1 to 3 above, the Teflon is substituted by an equivalent amount of Hycar rubber, and nylon granules, respectively.

Pressure tests carried out in a manner similar to those described in Example 1 likewise indicate improved pressure sealing characteristics for the resulting thread sealing compositions, as compared to the same compositions containing only talc, and in the absence of the Hycar or nylon.

Example 9

In Compositions B, C, D and E of Examples 1 to 3 above, the graphite-free grease employed therein is replaced by the same amount of the graphite-containing grease Compositions I and II, respectively.

The resulting thread sealing compositions containing graphite are dark gray to black materials having thread sealing characteristics under pressure comparable to those obtained using Compositions B, C, D and E, and which are eminently suited for oil well operations but which are not suitable for food processing as in the case of the "white" Compositions B, C, D and E containing the graphite-free grease.

Example 10

In Compositions B, C, D and E of Examples 1, 2 and 3 above, the graphite-free grease thereof is replaced by the same amount of "Shell Darina" (Composition III above). A light colored thread sealing composition is obtained having pressure sealing characteristics comparable to those of Compositions B, C, D and E.

From the foregoing, it is seen that the invention provides a novel and improved thread sealing composition, including a plastic granular deformable material as defined above, preferably Teflon, and a lubricity-improving substance, preferably talc, which have improved pressure sealing and lubricating characteristics, which can be employed in a variety of applications including both oil well applications and food processing, and which are of reduced cost. The advantages of the invention compositions include lubricating characteristics permitting tighter make-up with less torque, the ability to hold make-up even under vibration and loading, the ability to permit breaking out of a joint easily without galling of threads, extension of the use and life of threaded equipment, and the composition is readily applied by conventional brushing or by other suitable means, such as by application from a "squeeze" bottle.

While we have described particular embodiments of our invention for purposes of illustration, it should be understood that various modifications and adaptations thereof may be made within the spirit of the invention, as set forth in the appended claims.

We claim:
1. A thread sealing composition consisting essentially by weight of about 50% to about 90% of a grease, about 2% to about 45% of tetrafluoroethylene resin granules, at least about 75% of said granules being of a particle size passing through a 20 mesh screen and which is retained on an 80 mesh screen, said granules having a compression strength in the order of about 1000 to about

20,000 p.s.i. and a modulus of elasticity in tension of about 50,000 to about 500,000 p.s.i., and about 5% to about 45% of talc, the total amount of tetrafluoroethylene resin and said talc being in the range of from about 10% to about 50%, said tetrafluoroethylene resin and said talc being in suspension in said grease.

2. A thread sealing composition as defined in claim 1, the amount of said tetrafluoroethylene resin being in the range from about 5% to about 30%, the amount of said talc being in the range from about 10% to about 35%, the total amount of said tetrafluoroethylene resin and talc being in the range from about 15% to about 45%, by weigth of said composition.

3. A thread sealing composition as defined in claim 2, the amount of said grease being in the range from about 55 to about 85% by weight.

4. A thread sealing composition as defined in claim 2, said grease present in an amount of about 55 to about 85% by weight, said grease including a mineral oil and a thickener and being substantially graphite-free.

5. A thread sealing composition as defined in claim 1, wherein about 15% to about 50% by weight of said tetrafluoroethylene resin granules are of a particle size passing through a 20 mesh screen and retained on a 40 mesh screen.

6. A thread sealing composition as defined in claim 1, said talc having a mesh size passing a 325 mesh screen.

7. A thread sealing composition as defined in claim 1, said grease including a mineral oil, said composition being free of graphite and substantially white.

8. A thread sealing composition as defined in claim 1, said grease including a mineral oil and graphite.

References Cited

UNITED STATES PATENTS

| | | | |
|---|---|---|---|
| 2,586,357 | 2/1952 | Llewellyn. | |
| 2,593,582 | 4/1952 | Lontz et al. | |
| 2,906,123 | 9/1959 | Vernet et al. | |
| 3,007,866 | 11/1961 | Chamberlin | 252—22 |
| 3,011,975 | 12/1961 | Nitzsche et al. | 252—25 |
| 3,063,941 | 11/1962 | Wilson | 252—16 |
| 3,069,387 | 12/1962 | Allen et al. | 252—58 |
| 3,159,577 | 12/1964 | Ambrose et al. | 252—58 |
| 3,194,762 | 7/1965 | Browning et al. | 252—51.5 |
| 3,234,758 | 2/1966 | Lewis | 252—58 |
| 3,247,116 | 4/1966 | Reiling | 252—58 |

FOREIGN PATENTS 823,357  11/1959  Great Britain.

OTHER REFERENCES

Boner: Manufacture and Application of Lubricating Greases, Reinhold Pub. Corp., New York, 1954, pp. 760, 775–781, 791.

ALLAN LIEBERMAN, *Primary Examiner.*

U.S. Cl. X.R.

252—58